(12) United States Patent
Heller, Jr.

(10) Patent No.: US 6,517,975 B1
(45) Date of Patent: Feb. 11, 2003

(54) LITHIUM ELEMENT AND ANODE ASSEMBLY FOR AN ELECTROCHEMICAL CELL

(75) Inventor: Bernard F. Heller, Jr., Fridley, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 09/524,070

(22) Filed: Mar. 13, 2000

Related U.S. Application Data

(60) Continuation of application No. 09/246,824, filed on Feb. 8, 1999, now abandoned, which is a division of application No. 08/882,616, filed on Jun. 25, 1997, now abandoned.

(51) Int. Cl.[7] .............................. H01M 4/58; H01M 2/06
(52) U.S. Cl. .................. 429/231.95; 429/165; 429/162; 429/179
(58) Field of Search ................................. 429/165, 179, 429/231.95, 211, 162

(56) References Cited

U.S. PATENT DOCUMENTS

| | | | |
|---|---|---|---|
| 4,091,182 A | * 5/1978 | Farrington et al. | ......... 429/101 |
| 4,092,464 A | * 5/1978 | Dey et al. | .................... 429/127 |
| 4,166,158 A | 8/1979 | Mead et al. | ................. 429/181 |
| 4,182,798 A | 1/1980 | Skarstad | ..................... 429/213 |
| 4,359,818 A | 11/1982 | Zayatz | ....................... 29/623.1 |
| 4,398,346 A | 8/1983 | Underhill et al. | .......... 29/623.5 |
| 4,401,736 A | 8/1983 | Zayatz | ........................ 429/211 |
| 4,410,608 A | * 10/1983 | Goebel et al. | .............. 429/101 |
| 4,421,833 A | 12/1983 | Zayatz | ........................ 429/101 |
| 4,601,962 A | 7/1986 | Zayatz | ........................ 429/211 |
| 4,812,376 A | 3/1989 | Rudolph | ..................... 429/101 |
| 4,824,744 A | 4/1989 | Kuo et al. | ................... 429/209 |
| 5,154,989 A | * 10/1992 | Howard et al. | ............. 429/160 |
| 5,209,994 A | 5/1993 | Blattenberger | .............. 429/213 |
| 6,136,466 A | * 10/2000 | Takeuchi et al. | .............. 429/94 |
| 6,174,338 B1 | * 2/2001 | Heller | ........................ 29/623.1 |

* cited by examiner

Primary Examiner—Carol Chaney
Assistant Examiner—Tracy Dove
(74) Attorney, Agent, or Firm—Girma Wolde-Michael; Tom Woods; Paul H. McDowall

(57) ABSTRACT

In electrochemical cells for medical devices having anodes assemblies, an anode assembly includes a folded lithium element having a first and second section. The first and second sections are for receiving a current collector therebetween. A method of forming an anode arrangement includes a step of folding a lithium element having the first and second sections with a current collector positioned therebetween. Thereafter, a pressing step is performed.

8 Claims, 7 Drawing Sheets

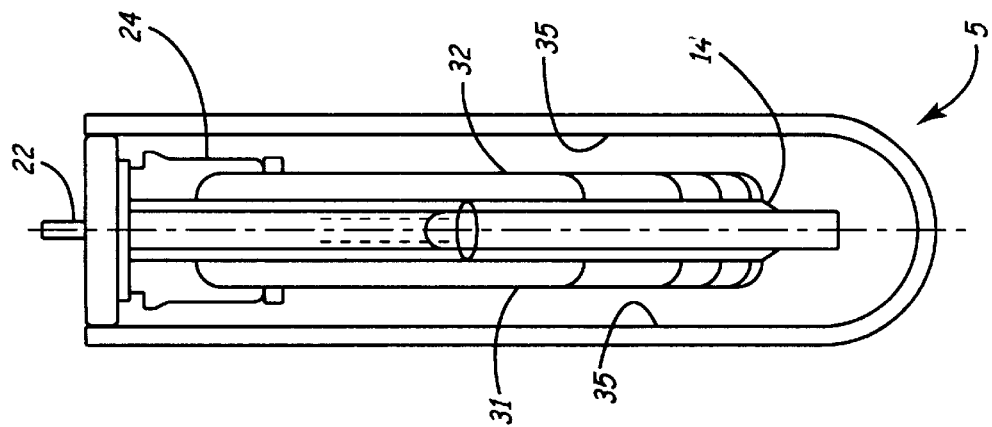
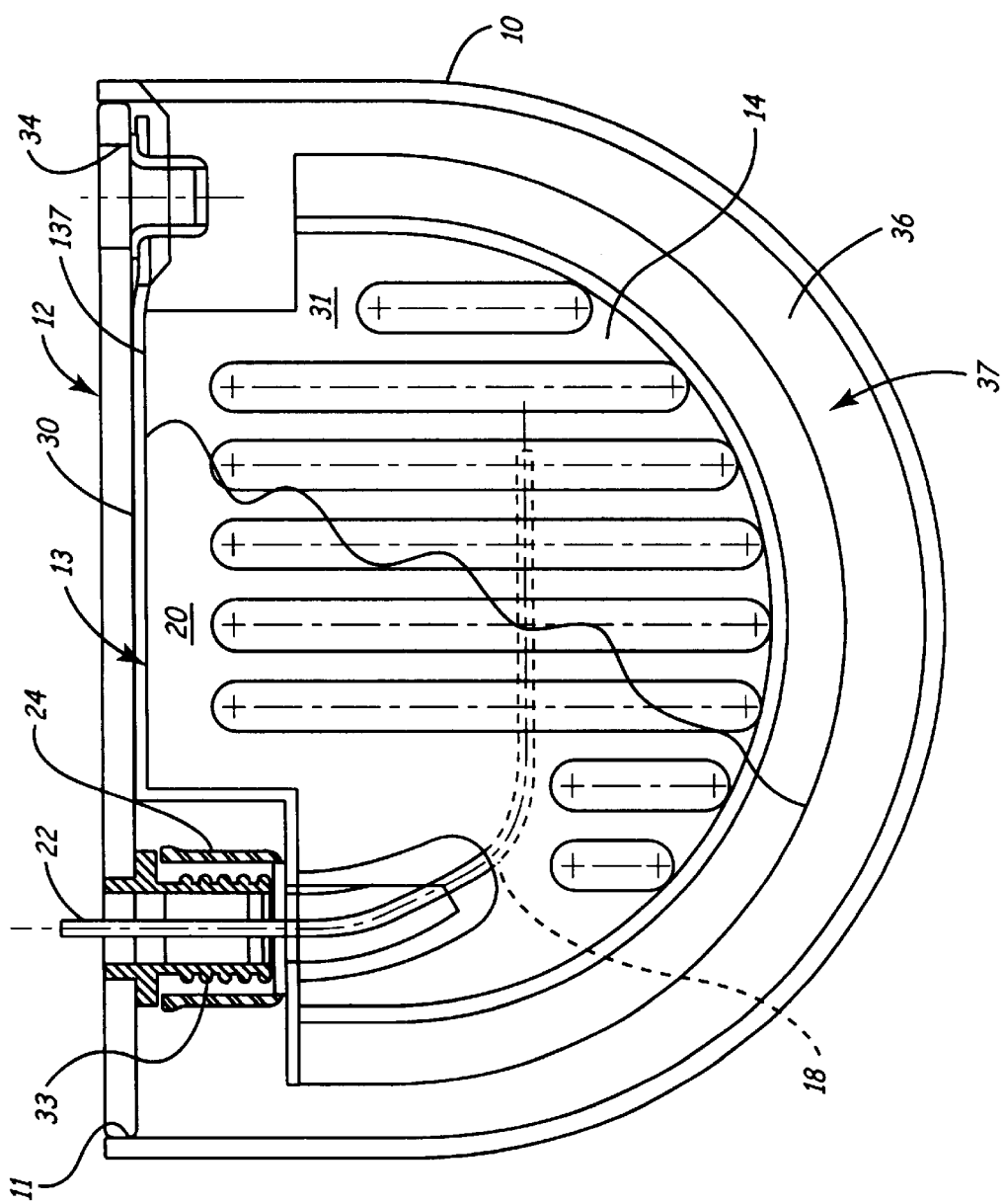

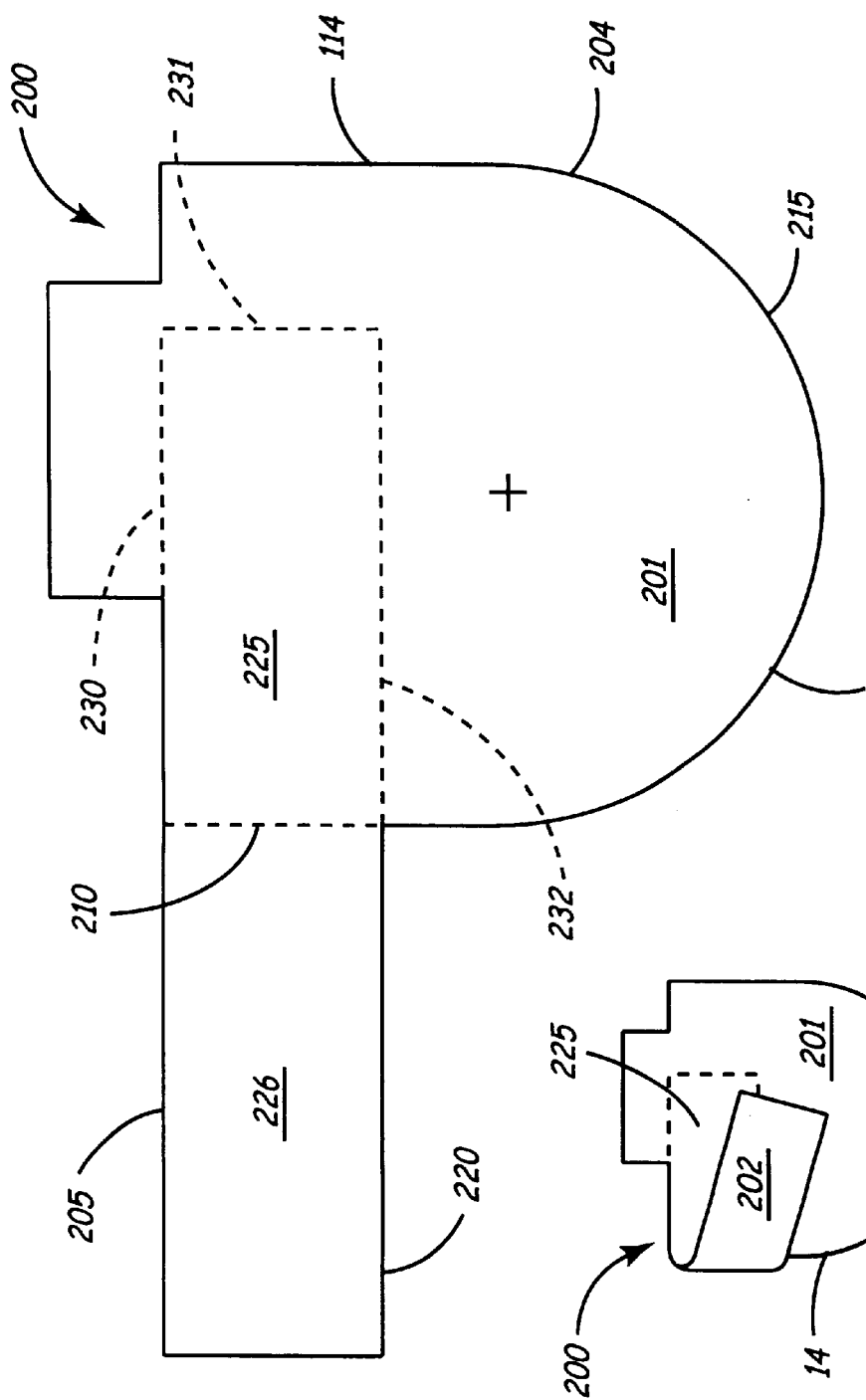

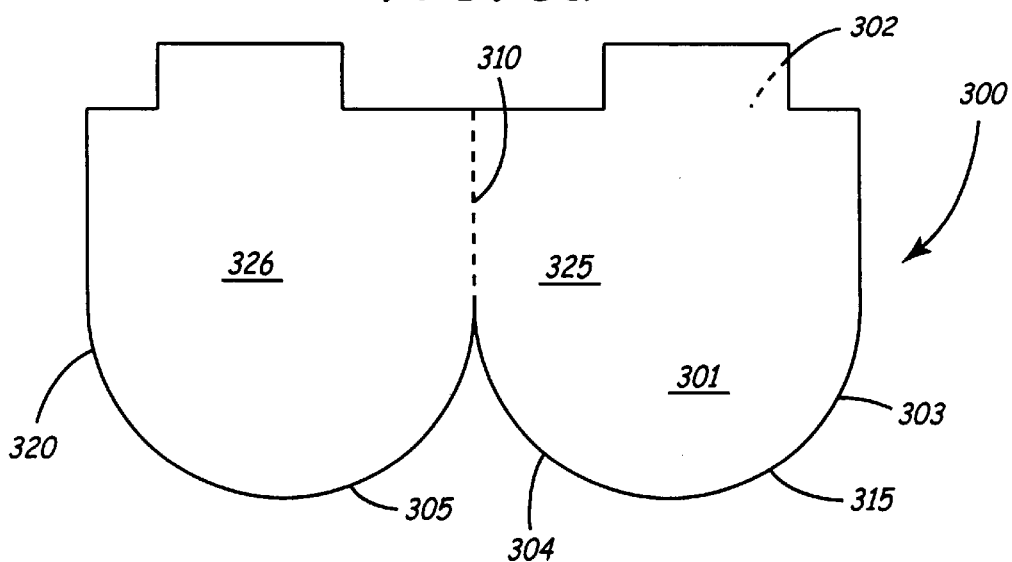
FIG. 6a
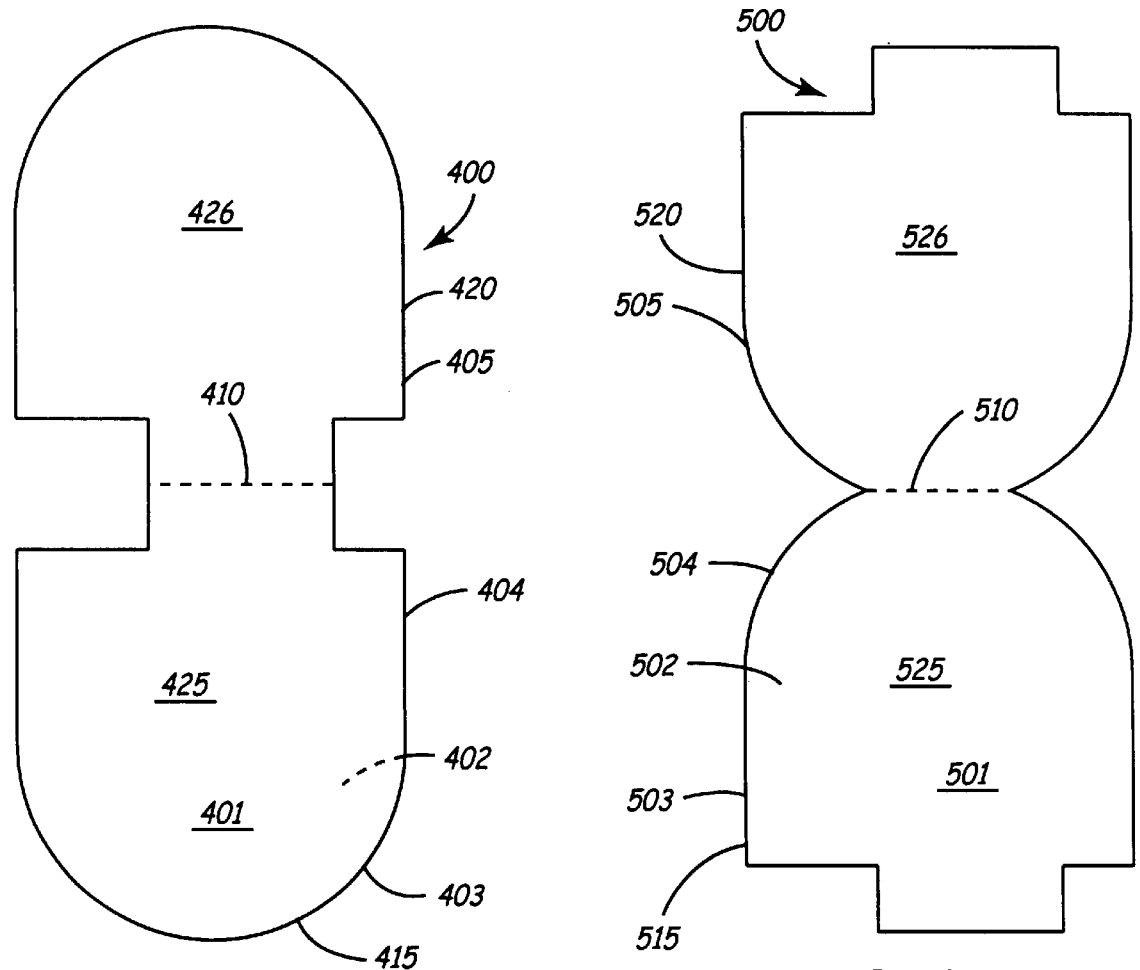
FIG. 6b
FIG. 6c

LITHIUM ELEMENT AND ANODE ASSEMBLY FOR AN ELECTROCHEMICAL CELL

This application is a continuation of Ser. No. 09/246,824 filed Feb. 8, 1999 now ABD which is a division of Ser. No. 08/882616 filed Jun. 25, 1997 now ABN.

FIELD OF THE INVENTION

The present invention relates to a foldable lithium element and anode assemblies in an electrochemical cell for use with medical devices. This invention further relates to methods of making such anode assemblies.

BACKGROUND OF THE INVENTION

Electrochemical cells having thin planar anode assemblies have found particular applications in the medical field for use with heart pacemakers and other medical devices. General teachings concerning such cells may be found, for example, in U.S. Pat. No. 5,209,994 (hereinafter '994), assigned to the assignee of the present invention. The '994 cell includes a container of electrically conductive material which serves as a cathode current collector. The anode assembly of the cell includes a lithium element formed from two lithium halves which are pressed together with an anode current collector therebetween. The anode current collector extends to the exterior of the cell with use of an insulator which insulates a lead connected thereto from electrical contact with the container. The container is filled with a cathode material which is in operative contact with the exposed surfaces of the lithium element of the anode assembly. Similarly, the cathode material is in operative contact with the container. For enhanced performance of the cell, the opposed, major lateral surfaces (i.e., the "operative surfaces") of the lithium element may be coated with a film of electron donor material. More specifically, '994 describes this donor material as being a polymeric organic donor material such as poly (2-vinylpyridine). Such donor materials and application techniques for such materials are more fully described in U.S. Pat. No. 4,182,798.

In operation, a chemical reaction between the lithium element and the cathode material in the container causes excess electrons to flow in the current collector. A chemical reaction between the cathode material and the container causes the container to be positively charged. The resulting voltage differential can be used to power a device. To prevent the cell from short-circuiting the anode current collector is electrically insulated from the cathodic container and from the cathode material which fills the container. As noted above, an insulator (i.e., a feedthrough) allows the anode current collector to extend to the exterior of the container without making electrical contact with the cathodic container. Additionally, the anode current collector is protected from contact with the cathode material by the seal formed by cohesion between the two lithium halves between which the collector is embedded.

In a conventional method for forming an anode assembly, two lithium pre-cut elements are positioned on opposite sides of an anode current controller. An insulated portion of the anode current collector which insulates the collector from the cathodic container is also typically positioned between the two lithium elements. The subassembly is then placed within two mold sections and is pressed together with a suitable force. The current collector and the insulator portion are sealed between the two lithium elements with a portion of the current collector (i.e., the lead) extending from the pressed together lithium elements for electrical connection of the electrochemical cell to a medical device.

Conventionally, the lithium halves are roughened, e.g., brushed, to enhance cohesion between the pre-cut lithium halves. Cohesion of the lithium halves sealing the anode current collector therein is necessary to prevent the cathode material from reaching the anode current collector and rendering the electrochemical cell inoperative. As such, techniques of enhancing such cohesion are needed.

In electrochemical cells, anode assemblies using lithium elements have been found to provide relatively small and efficient cells, particularly in conjunction with cathode materials, such as iodine or thionylchloride. However, costs associated with using pre-cut lithium halves to form such anode assemblies is of cohesion. Lithium has continuously been increasing in price as have labor costs associated with each pre-cut element. As such, there is a need for anode assembly configurations which at least hold the line on such costs.

Table 1 below lists U.S. Patents that describe electrochemical cells having thin plate anodes:

TABLE 1

| U.S. Pat. No. | Inventor(s) | Issue Date |
| --- | --- | --- |
| 4,166,158 | Mead, et al. | Aug. 28, 1979 |
| 4,359,818 | Zayatz | Nov. 23, 1982 |
| 4,398,346 | Underhill, et al. | Aug. 16, 1983 |
| 4,401,736 | Zayatz | Aug. 30, 1983 |
| 4,421,833 | Zayatz | Dec. 20, 1983 |
| 4,601,962 | Zayatz | Jul. 22, 1986 |
| 4,812,376 | Rudolph | Mar. 14, 1989 |
| 4,824,744 | Kuo et al. | Apr. 25, 1989 |
| 5,209,994 | Blattenberger et al. | May 11, 1993 |

All patents listed in Table 1 above and elsewhere herein are hereby incorporated by reference in their respective entirety. As those of ordinary skill in the art will appreciate readily upon reading the Summary of the Invention. Detailed Description of the Embodiments and Claims set forth below, many of the devices and methods disclosed in the patents of Table 1 may be modified advantageously by using the teachings of the present invention.

SUMMARY OF THE INVENTION

The present invention has certain objects. That is, various embodiments of the present invention provide solutions to one or more problems existing in the prior art with respect to lithium elements and anode assemblies in electrochemical cells. One such problem is obtaining satisfactory cohesion between lithium elements in an anode assembly. To enhance cohesion, it has been typical practice to roughen the facing surfaces of the lithium plates by "brushing," such as with an abrasive material before the plates are pressed together. Brushing leaves fresh, unoxidized lithium material exposed which coheres relatively well. However, this brushing step adds labor and time to the cost of manufacturing the resulting cell.

A further problem with the present two lithium element anode assemblies is that the stamping of two separate lithium elements requires a relatively significant amount of lithium material, time and labor, and generates excessive waste material. An arrangement that reduces scrap resulting from lithium element production, without impairing the performance of the cell, would offer significant advantage.

Various embodiments of the present invention have the object of solving at least one of the foregoing problems.

Further, an embodiment that requires only a single lithium element, thereby eliminating manufacturing time and labor, would reduce the cost of manufacturing a cell. In addition, an embodiment that minimizes the amount of scrap in production of the lithium elements is also advantageous. Still further, an embodiment that does not require brushing prior to pressing would reduce the time and cost of manufacturing.

In comparison to known lithium elements and anode assemblies, various embodiments of the present invention may provide one or more of the following advantages: eliminating one of the two separate lithium elements, thereby reducing the time and labor required to produce the second lithium element; enhancing the flow of the lithium material during pressing which enhances the cohesion for adequate sealing of the anode current collector, thereby reducing the need for "brushing" the facing surfaces of the lithium plates prior pressing the plates together; and minimizing the amount of scrap material in the production of the lithium elements, thereby reducing the cost of the element and thus cost of the cell.

Some embodiments of the invention include one or more of the following features: a folded lithium element; a folded lithium element having first and second sections in which at least a portion of the first section lies adjacent to at least a portion of the second section to receive a current collector therebetween; a folded lithium element having first and second sections where surface areas of the sections are substantially equivalent; and a folded lithium element having a first and second sections where a surface area of the first section is less than a surface area of the second section.

BRIEF DESCRIPTION OF THE DRAWINGS

FIG. 2a is a cross-sectional view of an electrochemical cell incorporating an anode assembly according to the present invention.

FIG. 2b is an end cross-section view of the cell of FIG. 2a.

FIG. 5a is a plan view of a preferred embodiment of a lithium element according to the present invention.

FIG. 5b is a modified plan view of a partially folded lithium element formed by the lithium element illustrated in FIG. 5a.

FIGS. 6a–6c are plan views of alternative embodiments of a lithium element according to the present invention.

DETAILED DESCRIPTION OF THE EMBODIMENTS

Figure 1:
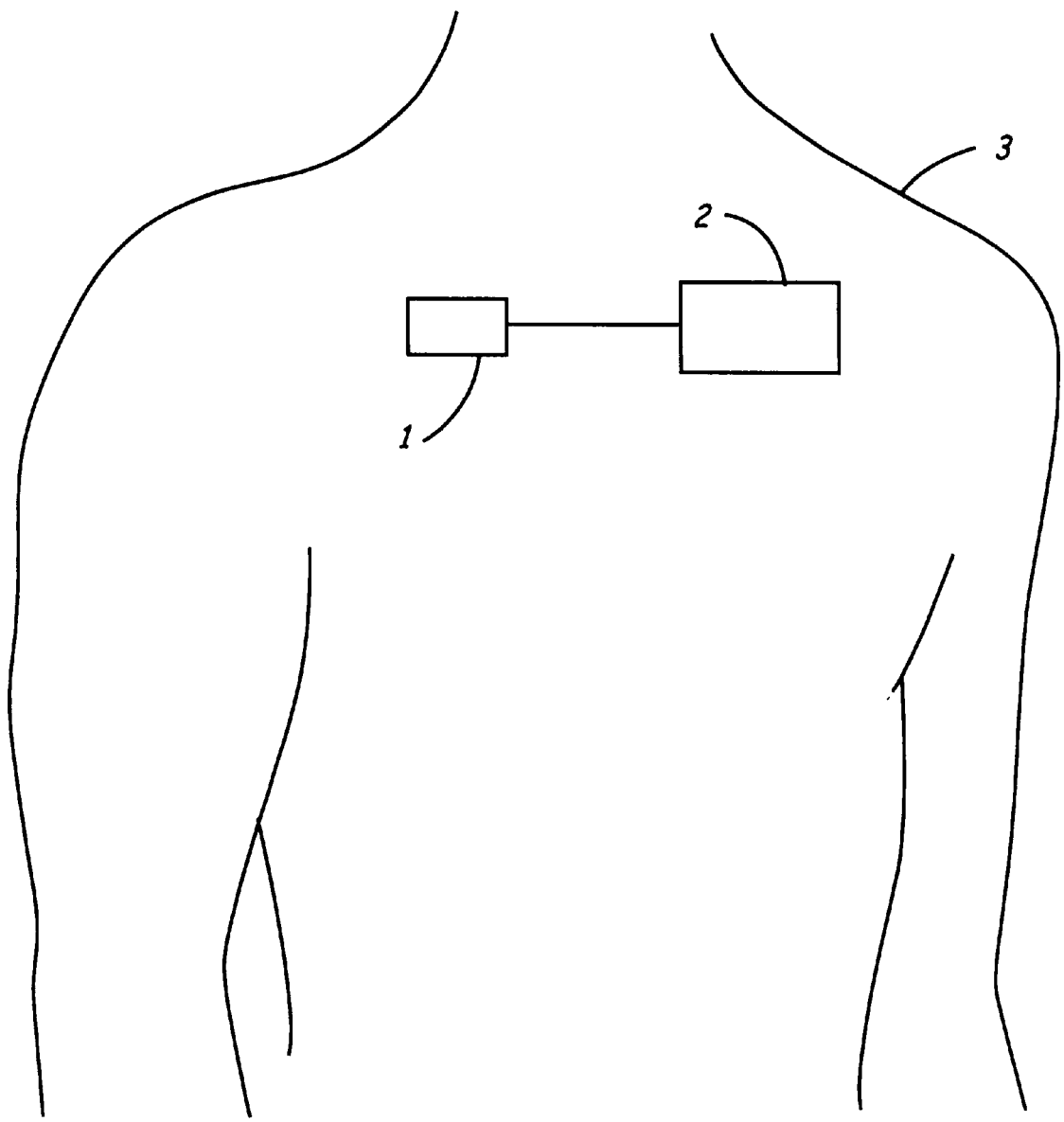
FIG. 1 is a schematic representation of an implantable medical device implanted inside a human body powered by an electrochemical cell.

Throughout the several figures and this description, like reference numerals designate like elements.

Electrochemical cells 1, or batteries, generate electrical current from chemical energy. Such cells have found widespread use a power sources in medical devices 2 such as heart pacemakers implanted in a human body 3, as illustrated in FIG. 1.

FIGS. 2a and 2b show an illustrative electrochemical cell 5 including an anode assembly 13. The cell 5 has a container or casing 10 made of metal, such as stainless steel, or other suitable electrically conductive material. Container 10 has an open top or end 11 which is closed by a lid 12, also of metal such as stainless steel. The lid 12 is attached to container 10, such as, for example, by welding.

The anode assembly 13 includes a folded lithium element 14 having an embedded anode current collector 18. The structure of the folded lithium element 14 and the manner in which current collector 18 is embedded therein will be described further below with reference to FIGS. 3–6. Current collector 18 may be an extension of an electrical lead 22 extending outward of the container 10. Both the lead 22 and current collector 18 may be a thin conductive pin made of, for example, Alloy 52, nickel, or stainless steel. Electrical lead 22 is of sufficient length to extend out of container 10 for making an external electrical connection thereto. Current collector 18 and lead 22 are sealed from the remainder of the cell contents by an insulator element generally designated 24 which surrounds lead 22 and which may take one of any number of configurations as known to one skilled in the art. Generally, insulator 24 is of a material which in addition to being non-conductive is also non-reactive with the contents of the cell 5 and may be formed of, for example, fluoropolymers, ceramic, glass, plastic, etc., as is known in the art. Many other non-reactive materials may be used for insulator 24.

As shown in the illustrative cell 5 of FIGS. 2a and 2b, the anode assembly 13, which includes folded lithium element 14 and current collector 18, is electrically insulated from lid 12 by an insulator band 30. Band 30 extends along a portion of the peripheral edge of the lithium element 14 and is also of a non-conductive, non-reactive material. It should be readily apparent to one skilled in the art that cell 5 is only one illustrative embodiment of a cell incorporating a folded lithium element in accordance with the present invention. The present invention is in no manner limited to such a cell configuration, but is limited only as described in the accompanying claims.

The anode assembly 13 is provided with a coating or film 20 of polymeric organic donor material, such as, for example, poly (2-vinylpyridine). The polymeric donor film 20 may take the form of a perforated film, covering the operative or opposed lateral (i.e., outer) surfaces 31, 32 of anode assembly 13. As taught in U.S. Pat. No. 5,209,994, the thickness of the polymeric organic donor material can be controlled to achieve desired end—of—life voltage drop characteristics.

The anode assembly 13 is positioned in container 10 with the opposed lateral surfaces 31, 32 of the folded lithium element 14 spaced from the inner surface 35 of the container 10. Plastic clips (not shown) may be used for this positioning if desired. The anode assembly 13 is positioned in container 10 as part of a lid and anode assembly, such as assembly 50, shown in FIG. 3a and further described below.

The lid and anode assembly includes anode assembly 13 and a lid 12 which can be welded to container 10. Further, the assembly 50 includes a feedthrough ferrule 33 and a fillport 34 extending from lid 12 into the interior of the container 10. Electrical lead 22 extends through the feedthrough 33 to the exterior of the cell. It should be readily apparent that any lid, feedthrough, fillport, insulative structure is contemplated for use in accordance with the present invention. The present invention is in no manner limited to any particular configurations or materials for such elements.

Container 10 defines an interior cell cavity 37 which is filled with cathode material 36, such as halogen cathode materials, for example, iodine containing cathode materials or thionylchloride. The cathode material 36 operatively contacts the exposed (i.e., operative) surfaces 31, 32 of the folded lithium element 14. The amount of cathode material 36 in the container is preferably sufficient to contact the exposed lateral surfaces 31, 32 of folded lithium element 14 and to reach a level at or adjacent the interior surface of lid 12. The opening, i.e., fillport, in lid 12 is hermetically sealed, for example, with a series of closure members or plugs.

In operation, container 10, being of electrically conductive material, serves as a cathode current collector in direct contact with the cathode material 36 in container 10. Consequently, an electrical lead (not shown) may be attached directly to the exterior of container 10 for cathode contact. Another electrical lead can be connected to the electrical lead 22 to make electrical connection with the anode assembly 13. A chemical reaction between the lithium element 14 and the cathode material 36 in container 10 causes electrons to flow into the current collector 18. A chemical reaction between the cathode material 36 and the container 10 causes the container 10 to be positively charged. The resulting voltage differential across the cell 5 is used to generate power for a medical device.

To prevent the cell 5 from short-circuiting, the current collector 18 is isolated from the cathode container 10 and from the cathode material 36 which fills container 10. As noted above, an insulator 24 allows the current collector 18 to extend to the exterior of the container 10 without making electrical contact with the cathode container 10. Additionally, the current collector 18 is protected from contact with the cathode material 36 by the seal formed by the folded lithium element 14 about the current conductor 18 embedded therein.

Figure 3A:
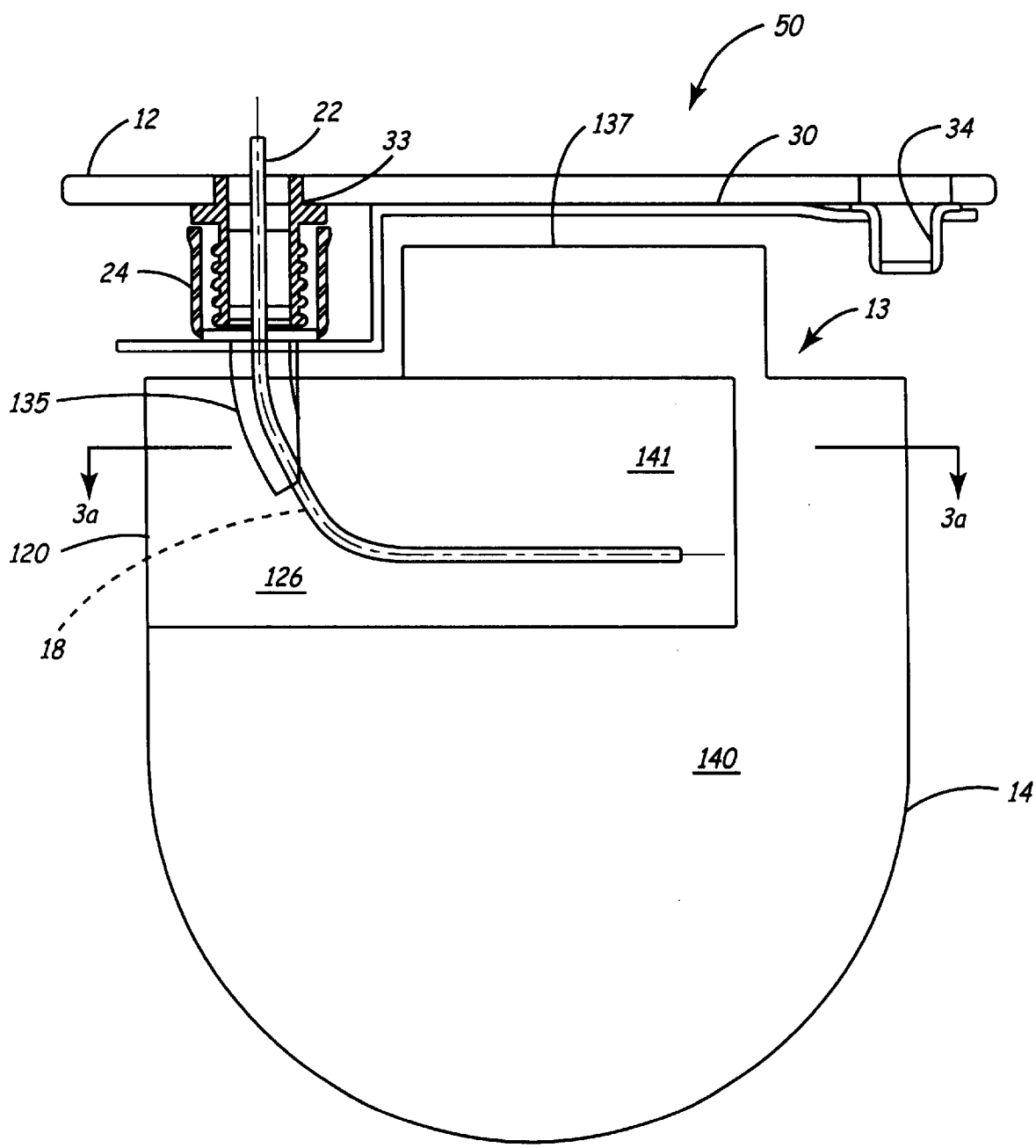
FIG. 3a is a plan view of an assembly of a portion of the cell illustrated in FIG. 2a, with parts shown in cross-section.
Figure 3B:
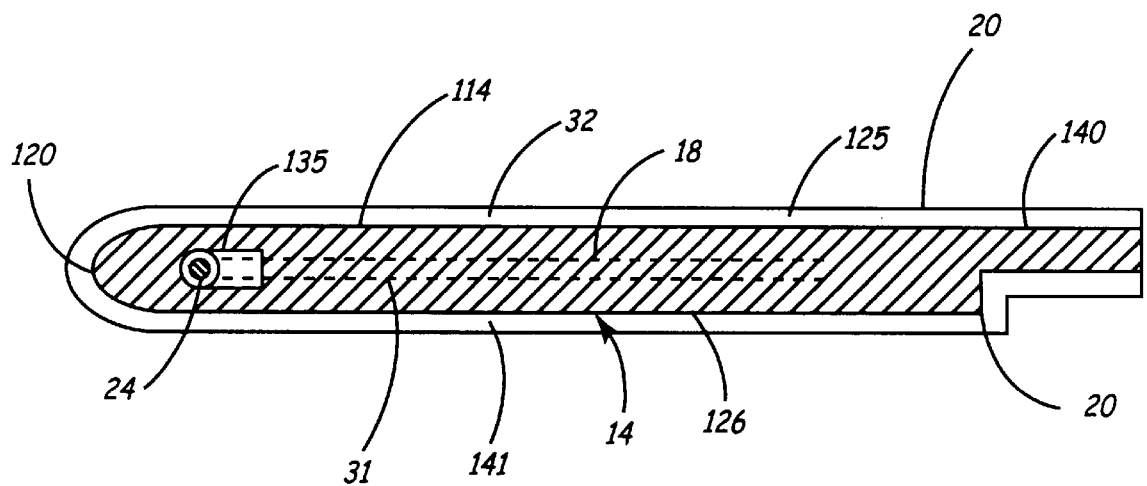
FIG. 3b is a cross-sectional view of the anode assembly shown in FIG. 3a, taken along line 3b–3b.

FIG. 3a shows one embodiment of an anode and lid assembly 50 that forms part of the cell 5. Assembly 50 includes the anode assembly 13, the lid 12 including fillport 34 and ferrule 33, insulator 24 and insulator band 30. As noted above, the anode assembly 13 includes folded lithium element 14 and current collector 18 embedded therein. In the embodiment illustrated in FIGS. 3a and 3b, folded lithium element 14 is formed by folding one section 141 of lithium element 14 along a fold line 120 such that a portion 125 of another section 140 of the lithium element 14 lies adjacent portion 126 of section 141. Portion 125 is not visible in FIG. 3a because it is covered by portion 126, but is illustrated in FIGS. 3b and 5. Current collector 18 is interposed or sandwiched between the portions 125, 126 of folded lithium element 14. A part 135 of insulator 24 is also sandwiched between portions 125 and 126. Insulator band 30 extends along a portion of peripheral edge 137 of folded lithium element 14 forming a barrier between the lithium element 14 and the lid 12 to preclude electrical contact therebetween.

Generally, the lithium element 14 includes two sections 140 and 141 divided by fold line 120. Sections 140 and 141 are foldably hinged to each other. Fold line 120 is defined herein as only referring to the position at which the sections of the foldable lithium element are connected. The fold line 120 need not have any structural differences than the remainder of the lithium element 14. In other words, the fold line is not perforated, precreased, or structurally altered in any manner prior to folding. However, such structural alteration or like techniques may be used.

In the embodiment shown in FIG. 3a, section 141 is smaller in surface area than section 140 such that section 141 covers only a portion of section 140. That is, the portion 126 of section 140 is smaller than the surface area of section 140. However, as described below, various other configurations are contemplated according to the present invention. The surface area of smaller section 141 need only be large enough to completely cover the current collector 18 and a portion 135 of insulator 24, so that after pressing the current collector 18 is sealed from exposure to the contents of the cell, particularly the cathode material.

FIG. 3b shows a cross-sectional view of the lid and anode assembly 50 taken at line 3b—3b. The cross-sectional view shows the donor material 20 coating the outer surfaces of the folded lithium element 14. The current collector 18 lies substantially centered between the two thicknesses of sections 140, 141.

Figure 4:
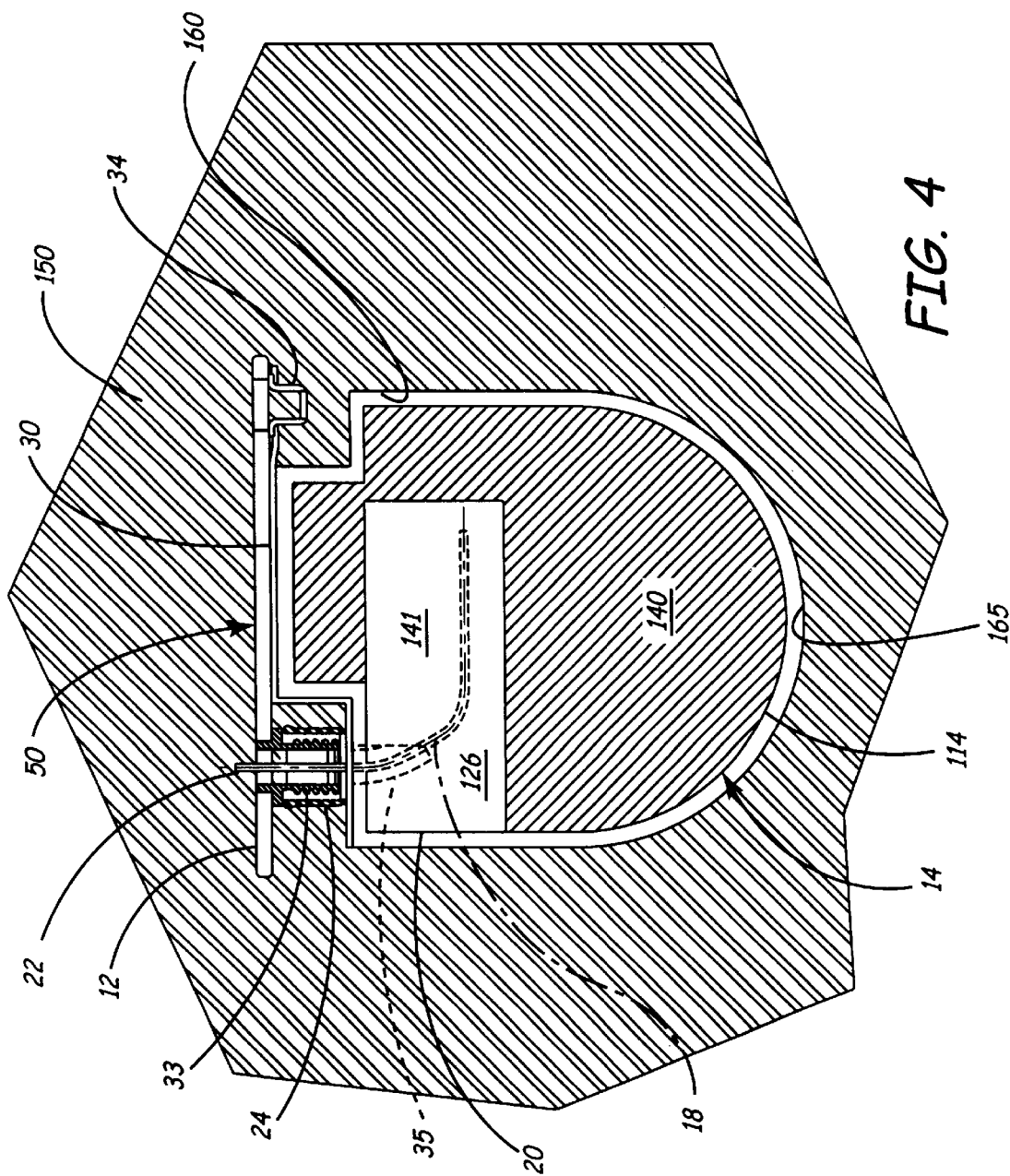
FIG. 4 is a plan view of the assembly of FIG. 3a in a die, with portions shown in cross-section.

FIG. 4 shows assembly 50 in a die 150 that is used to press the folded lithium element 14. The die 150 defines a cavity 160 that is sized and shaped to received assembly 50 and to exert pressure on the lithium element 14 when a portion of the die is closed over the assembly 50. Further, the cavity 160 is sized to leave a small gap 165 between the periphery of lithium element 14 and the wall defining the cavity 160.

It has been found that the cohesion achieved between the portions 125 and 126 of the lithium element 14 illustrated in FIGS. 3, 4 and 5, is particularly good due to the manner in which the lithium material of lithium element 14 responds when pressed. More specifically, it has been found that, when pressed, the lithium material of portion 126 is able to flow into the areas of section 140 that are not covered by the initial unpressed section 141. That is, the material from the double-thickness area flow into the area that is only a single thickness, particularly into the single thickness area surrounding the portion 126. This displacement, disruption, or relocation of the lithium material exposes fresh lithium metal without any oxides. The unoxidized lithium material yields better cohesion between the pressed portions 125, 126 than is achieved in prior art arrangements wherein two lithium plates of generally the same size and shape are pressed together.

With the prior art two-element arrangement, roughening of the facing surfaces of the lithium elements such as with an abrasive material prior to pressing is typically performed. Using differently sized sections, such that a relatively large displacement of material of at least one with respect to the other is achieved, reduces and potentially eliminates the need for roughening of the facing surfaces prior to pressing.

As described further below with respect to embodiments which include sections that have substantially equivalent surface areas, by maximizing the gap 165 size, the need for surface roughening may also be reduced. The size of gap 165 may be defined as being oversized relative to the unpressed anode assembly. Such oversizing may be in the range of about 0.010 inch (0.0254 cm) to about 0.050 (0.127 cm), preferably about 0.010 inch (0.0254 cm) to about 0.020 inch (0.0508 cm). However, due to limitations in the pressing of the anode assembly, particularly cracking of the donor material covering the lithium sections, the amount of displacement accomplished using gap 165 and, thus, the gap size, is limited. In other words, too large of a gap 165, which allows increased lithium displacement for better cohesion between the sections, may lead to cracking of the donor material covering the lithium element.

FIGS. 5a–5b and 6a–6c show various embodiments of a foldable lithium blank (i.e., pre-cut 200, 300, 400, 500) in planar or unfolded form, as it would be provided after manufacture. Such pre-cuts may be provided, such as by stamping from a sheet of lithium material. For convenient reference, the embodiment illustrated in FIG. 5 will be identified as a "flat pre-cut" and the alternative embodiments illustrated if FIGS. 6a, 6b, and 6c will be identified as "mirror-image pre-cuts." Any of these pre-cuts, when folded, can form folded lithium element 14 and can be used for an anode assembly 13.

The flap pre-cut 200 of FIGS. 5a and 5b has first and second opposed lateral surfaces 201, 202, and terminates at peripheral edge 203. Flap pre-cut 200 includes a main body section 204 which is completely integral with a flap section 205. Completely integral as used herein means being of a single continuous body of material. Dotted line 210 indicates a shared edge of flap section 205 and main body section 204. Line 210 further represents where the pre-cut 200 will be folded in use.

Main body section 204 terminates in a peripheral edge 215 which generally defines a shape approximately the same, but slightly smaller than the cell cavity into which the folded lithium element 14 made from the pre-cut 200 will be placed. Generally, the size and shape of the lithium element 14 is to be maximized, for maximum surface area contact with the cathode material, within the constraints of the size and shape of the cell cavity in which it is placed.

Flap section 205 terminates in a peripheral edge 220 that, in the embodiment illustrated in FIG. 5, generally defines a rectangle having surface area that is less than the surface area of main body section 204. When folded, flap section 205 lies adjacent portion 225 of main body section 204. The portion 226 of flap section 204 is substantially the whole of flap section 205. The portion 225 of main body section 204 is delineated by dotted lines 230, 231, 232, and 210, and has a size and shape substantially the same as that of the portion 226 of flap section 205. Thus, the portion 225 of main body section 204 has a surface area that is less than the entire surface area of the main body section 204 and the flap section 205 (and, thus, portion 226 of flap portion 205) has a surface area that is less than the surface area of the main body section of 204.

It will be understood by those of skill in the art that the peripheral shapes and sizes of main body section 204 and flap section 205 can be varied substantially within the scope of this invention, as defined in the accompanying claims. For example, flap section 205 could be semi-circular, elliptical, or any other suitable shape. It is only necessary that the flap section 205 be sized and shaped such that it will be able to cover the current collector 18 that will be sandwiched between the portions 225, 226 of flap section 205 and main body section 204. The shape and size of main body section 204 can be varied to accommodate a cell cavity 37 of other shapes and sizes. Further, it should be apparent that the current collector 18 may be positioned within an anode assembly in various locations. For example, the current collector need not be located in a parallel manner to the lid, but can extend at an angle or perpendicular to the lid. Therefore, the shape and size of flap section 205 may additionally take various other configurations corresponding to the locations of the current collector, so long as the flap section 205 when folded over main body section 204 covers the collector 18.

FIGS. 6a–6c show additional embodiments of a foldable lithium element according to the present invention. These three embodiments share the characteristic that they each include two integrally connected sections that are mirror-images of one another about a line that is used as a fold line to form a folded lithium element 14. A myriad of pre-cut shapes could be generated that would share this characteristic and are considered to be within the scope of this invention.

The mirror-image pre-cut 300 shown in FIG. 6a has first and second opposed lateral surfaces 301, 302 which terminate at peripheral edge 303. Pre-cut 300 includes a main body section 304 that is completely integral with a mirror-image section 305. Dotted line 310 indicates an edge shared by main body section 304 and mirror-image section 305. Line 310 further represents where the pre-cut 300 will be folded in use. Main body section 304 terminates in a peripheral edge 315 which generally defines a shape approximately the same but slightly smaller than the cell cavity 37 into which the folded lithium element 14 will be placed. As previously described, it is typical practice for the size and shape of the lithium element to be maximized. Mirror-image section 305 terminates in a peripheral edge 320.

When folded, main body section 304 and mirror-image section 305 have surfaces lying adjacent to one another. As the sections 304 and 305 are mirror images, the peripheral edges 315 and 320 are generally aligned or matched with each other. Thus, the portions of sections 304 and 305 lying adjacent to one another are substantially the whole of sections 304 and 305, respectively.

The mirror-image pre-cut 400 shown in FIG. 6b has first and second opposed lateral surfaces 401, 402 which terminate at peripheral edge 403. Pre-cut 400 includes a main body section 404 that is completely integral with a mirror-image section 405. Dotted line 410 indicates an edge shared by main body section 404 and mirror-image section 405. Line 410 further represents where the pre-cut 400 will be folded in use. Main body section 404 terminates in a peripheral edge 415 which generally defines a shape approximately the same but slightly smaller than the cell cavity 37 into which the folded lithium element 14 will be placed. Mirror-image section 405 terminates in a peripheral edge 420.

When folded, main body section 404 and mirror-image section 405 have surfaces lying adjacent to one another. As the sections 404, 405 are mirror images, peripheral edges 415 and 420 are generally aligned or matched with each other. Thus, the portions of sections 404 and 405 lying adjacent to one another are substantially the whole of sections 404 and 405, respectively.

The mirror-image pre-cut 500 shown in FIG. 6c has first and second opposed lateral surfaces 501, 502 which terminate at peripheral edge 503. Pre-cut 500 includes a main body section 504 that is completely integral with a mirror-image section 505. Dotted line 510 indicates an edge shared by main body section 504 and mirror-image section 505. Line 510 further represents where the pre-cut 500 will be folded in use. Main body section 504 terminates in a peripheral edge 515 which generally defines a shape approximately the same but slightly smaller than the cell cavity 37 into which the folded lithium element 14 will be placed. Mirror-image section 505 terminates in a peripheral edge 520.

When folded, main body section 504 and mirror-image section 505 have surfaces lying adjacent to one another. As the sections 504, 505 are mirror images, peripheral edges 515 and 520 are generally aligned or matched with each other. Thus, the portions of sections 504 and 505 lying adjacent to one another when the pre-cut is folded are substantially the whole of sections 504 and 505, respectively.

It will be understood by those of skill in the art that the peripheral shapes of main body sections 304, 404, 504 and mirror image sections 305, 405, 505 can be varied substantially within the spirit of this invention. For example, the line about which the main body section is mirrored can be anywhere along the peripheral edge of main body section 304, 404, 504. Further, the shape of main body section 304, 404, 504 and its mirror-image can be altered to accommodate cell cavities of various other shapes.

Typically, the thickness of the flap pre-cut used is in the range of about 0.060 inch (0.152 cm) to about 0.080 inch (0.203 cm), preferably about 0.072 inch (0.183 cm) to about 0.078 inch (0.198 cm). Typically, the thickness of the mirror-image pre-cuts is in the range of about 0.038 inch (0.097 cm) to about 0.048 inch (0.122 cm), preferably about 0.042 inch (0.107 cm) to about 0.044 inch (0.112 cm).

The present invention is further directed to methods of making or forming anode assemblies for electrochemical cells. Generally, a lithium pre-cut, as described herein, is folded such that at least a portion of a first section of the pre-cut lies adjacent at least a portion of a second section of the pre-cut. A current collector is placed between the portions of the pre-cut such that it is in contact therewith. The current collector encompassed in the folded pre-cut is then positioned in a die and pressed with sufficient force to achieve cohesion between adjacent portions of the sections.

Preferably, as shown in FIG. 4, a lid and anode assembly 50 including the anode assembly 13 and the cell lid 12 is constructed prior to pressing the folded lithium element 14. More specifically, the anode assembly 13 is attached to the lid 12 of a cell 5 with an insulator band 30 positioned between the lithium element 14 and the lid 12. Electrical lead 22 extends through the feedthrough ferrule 33 in the lid 12. This anode and lid assembly 50 is then placed in a die 150 and the lithium element 14 is pressed with sufficient force to achieve cohesion between portions 125 and 126 of the sections 140 and 141. The force used to perform such pressing will vary depending on the amount of material to be displaced, the shape and size of the lithium element, and various other factors. Typically, the pressure applied is in the range of about 1100 psi (75 atmospheres) to about 5900 psi (401 atmospheres), preferably about 2300 psi (156 atmospheres) to about 3500 psi (238 atmospheres).

After pressing, the assembly 50 is then inserted into the container 10, and the lid 12 is welded to the container 10. Cathode material 36 is poured into the cell cavity 37 through a fillport 34 in the lid 12. The fillport 34 is sealed with suitable plugs, such as stainless steel for the portion of the fillport 34 adjacent the lid 12 and such as Teflon for the portion of the fillport 34 that is in contact with the insulator band 30. The feedthrough ferrule 33 is sealed with a non-conductive material, such as glass.

When this method is employed with a mirror-image pre-cut 300, 400, 500, such as those illustrated in FIGS. 6a, 6b, and 6c, a layer or film of donor material can be positioned adjacent to each of the lateral opposing surfaces 301 and 302, 401, and 402, 501 and 502 of lithium element when the anode assembly is positioned in the die 150, such that the donor material film 20 is applied during pressing of the lithium element. Further, as the sections of the pre-cut mirror images, displacement of material for enhancement of cohesion of the adjacent surfaces of the sections occurs primarily at the periphery of the folded lithium element as the material displaces into gap 165.

When the flap section 141 is pressed with the main body section 140, displacement of the lithium material of the flap section 141 over a larger area of the main body section 140 occurs. This displacement reduces the need for and possibly eliminates the need for roughening the adjacent surfaces prior to pressing. Further, displacement of lithium into gap 165 occurs creating even better cohesion at the periphery of the folded lithium element.

When this method is employed with a flap pre-cut 200, such as that illustrated in FIG. 5a, it has been found that the donor material film is applied in two process steps. First, a film of donor materials is applied adjacent the main body section 204 before lithium element 14 has been pressed. After pressing and displacement of the lithium material of the flap section during pressing, a donor material film is applied over the other surface and thereafter once again pressed.

The preceding specific embodiments are illustrative of the practice of the invention. It is to be understood, therefore, that other expedients known to those skilled in the art or disclosed herein may be employed without departing from the invention or the scope of the appended claims. For example, the present invention is not limited to lithium elements having the particular peripheral shapes of the examples illustrated in FIGS. 5 and 6a–6c. The present invention further includes within its scope other methods of making and using the invention described hereinabove.

What is claimed is:

1. An anode assembly for insertion into a container of an electrochemical cell, the anode assembly comprising:
   an enclosure element assembly for enclosing an open side of the container;
   a folded lithium element assembly comprising;
      a current collector element; and
      a folded lithium element including a first section and a second section with a fold crease defined between the first section and the second section, wherein at least a portion of the first section covers at least a portion of the second section, and wherein at least a portion of the current collector element is disposed between the first section and the second section; and
   an insulated feedthrough assembly for allowing electrical connection of the current collector element through the enclosure element.

2. An anode assembly according to claim 1, wherein the first section has a total first section surface area that is less than a total second section surface area of the second section.

3. An anode assembly according to claim 2, wherein the first section is shaped to at least cover the current collector element from a distal end portion to a location where the current collector meets the insulated feedthrough assembly.

4. An anode assembly according to claim 1, wherein the first section and the second section have surface areas that are substantially equivalent.

5. An anode assembly according to claim 3, wherein the folded lithium element covers a portion of the insulated feedthrough assembly.

6. An anode assembly for insertion into a container of an electrochemical cell, the anode assembly comprising:
   a single homogenous lithium element with unbrushed surfaces, said lithium element being folded further comprising:
      a current collector element; and
      said lithium element including a first section and a second section with at least a portion of the first section covering at least a portion of the current collector element and wherein said current collector element is disposed between the first section and the second section; and
   an insulated feedthrough coupled to the current collector element and sealingly coupled to the enclosure element.

7. The anode assembly according to claim 6 wherein said unbrushed surfaces includes at least a portion of opposing surfaces of said first section and said second section.

8. An anode assembly according to claim 6 wherein said unbrushed surfaces include sections having unequal surface areas.

* * * * *